(12) United States Patent
Silverman et al.

(10) Patent No.: US 9,066,244 B2
(45) Date of Patent: Jun. 23, 2015

(54) UPLINK SIGNAL BANDWIDTH CHARACTERIZATION FROM CHANNEL STATE INFORMATION

(75) Inventors: Matthew A. Silverman, Shaker Heights, OH (US); Paul J. Stager, Akron, OH (US); Brian D. Hart, Sunnyvale, CA (US); Mohammad Janani, Plano, TX (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 13/459,330

(22) Filed: Apr. 30, 2012

(65) Prior Publication Data

US 2013/0286863 A1    Oct. 31, 2013

(51) Int. Cl.
*H04L 5/00* (2006.01)
*H04W 16/28* (2009.01)
*H04B 7/04* (2006.01)
*H04W 72/12* (2009.01)

(52) U.S. Cl.
CPC ............. *H04W 16/28* (2013.01); *H04L 5/0039* (2013.01); *H04B 7/0404* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 6,006,110 A | 12/1999 | Raleigh | |
| 6,101,399 A | 8/2000 | Raleigh et al. | |
| 6,665,545 B1 | 12/2003 | Raleigh et al. | |
| 7,825,856 B2 | 11/2010 | Na et al. | |
| 7,876,715 B1 | 1/2011 | Jin et al. | |
| 8,032,184 B2 | 10/2011 | Na et al. | |
| 8,059,744 B2 | 11/2011 | Jin et al. | |
| 8,116,698 B2 | 2/2012 | Hedayat et al. | |
| 8,134,503 B2 | 3/2012 | Na et al. | |
| 8,155,482 B2 | 4/2012 | Chan et al. | |
| 2008/0192644 A1* | 8/2008 | Utsunomiya et al. | 370/252 |
| 2011/0273977 A1* | 11/2011 | Shapira et al. | 370/208 |
| 2012/0328034 A1* | 12/2012 | Nabar et al. | 375/260 |

* cited by examiner

*Primary Examiner* — Marcus R Smith
(74) *Attorney, Agent, or Firm* — Edell, Shapiro & Finnan, LLC

(57) ABSTRACT

Techniques are provided to determine whether or not incident power at a wireless communication device in at least two frequency channels is from the same device. Incident power in frequency channels allocated to a basic service set in a wireless network is received at a plurality of antennas of the wireless communication device. Channel state information is computed for at least two frequency channels allocated to the basic service set. One or more metrics are generated based on the channel state information in the two frequency channels. The one or more metrics are evaluated to characterize an uplink signal bandwidth associated with the two channels to determine whether or not the incident power in the two channels is from the same device.

25 Claims, 7 Drawing Sheets

US 9,066,244 B2

UPLINK SIGNAL BANDWIDTH CHARACTERIZATION FROM CHANNEL STATE INFORMATION

TECHNICAL FIELD

The present disclosure relates to wireless communication systems and devices.

BACKGROUND

In wireless communication systems that employ beamforming of transmissions from a plurality of antennas of a first device to a second device (having one or more antennas), it is important to have reliable information about the channel conditions between the antennas of the first and second devices. One type of beamforming technique, known as implicit beamforming, uses uplink traffic received by the first device from the second device to capture the most up-to-date channel information. That channel information is converted into a beamforming vector used for sending a beamformed transmission from the first device to the second device.

In some wireless communication systems, such as those that operate in accordance with the IEEE 802.11n and 802.11ac standards, single channels can be combined to allow for wider bandwidth transmissions. Thus, one channel is designated a primary channel and the adjacent channel is designated a secondary channel, and the secondary channel can be aggregated together with the primary channel for a wider bandwidth transmission. For example, according to one feature of the 802.11n standard, a "legacy duplicate mode" packet is sent over 40 MHz whereby the same data (acknowledgment packets) are transmitted over two adjacent 20 MHz channels.

When receiving legacy duplicate mode packets, currently designed and deployed radio transceiver chipsets for IEEE 802.11n discard the secondary channel's packet and only demodulate the primary signal. As a consequence, the transceiver chipset does not output channel state information (CSI) for the secondary channel because the transceiver chipset cannot determine if it is a duplicate mode packet or just a 20 MHz legacy packet in the secondary channel. It would be beneficial to know if the packet in the secondary channel is from an intended client or some adjacent/overlapping AP/client in order to know whether to use the CSI for the secondary channel in computing downlink transmit beamforming weights to transmit to a particular client. If the AP is not able to know when to discard the CSI for the secondary channel, it is possible that the AP may overwrite good/reliable beamforming weight information with unreliable information.

DESCRIPTION OF EXAMPLE EMBODIMENTS

Overview

Techniques are provided to determine whether or not incident power at a wireless communication device in two frequency channels is from the same device. Incident power in frequency channels allocated to a basic service set in a wireless network is received at a plurality of antennas of the wireless communication device. Channel state information is computed for at least two frequency channels allocated to the basic service set. One or more metrics are generated based on the channel state information in the two frequency channels. The one or more metrics are evaluated to characterize an uplink signal bandwidth associated with the two channels to determine whether or not the incident power in the two channels is from the same device.

Example Embodiments

Figure 1:
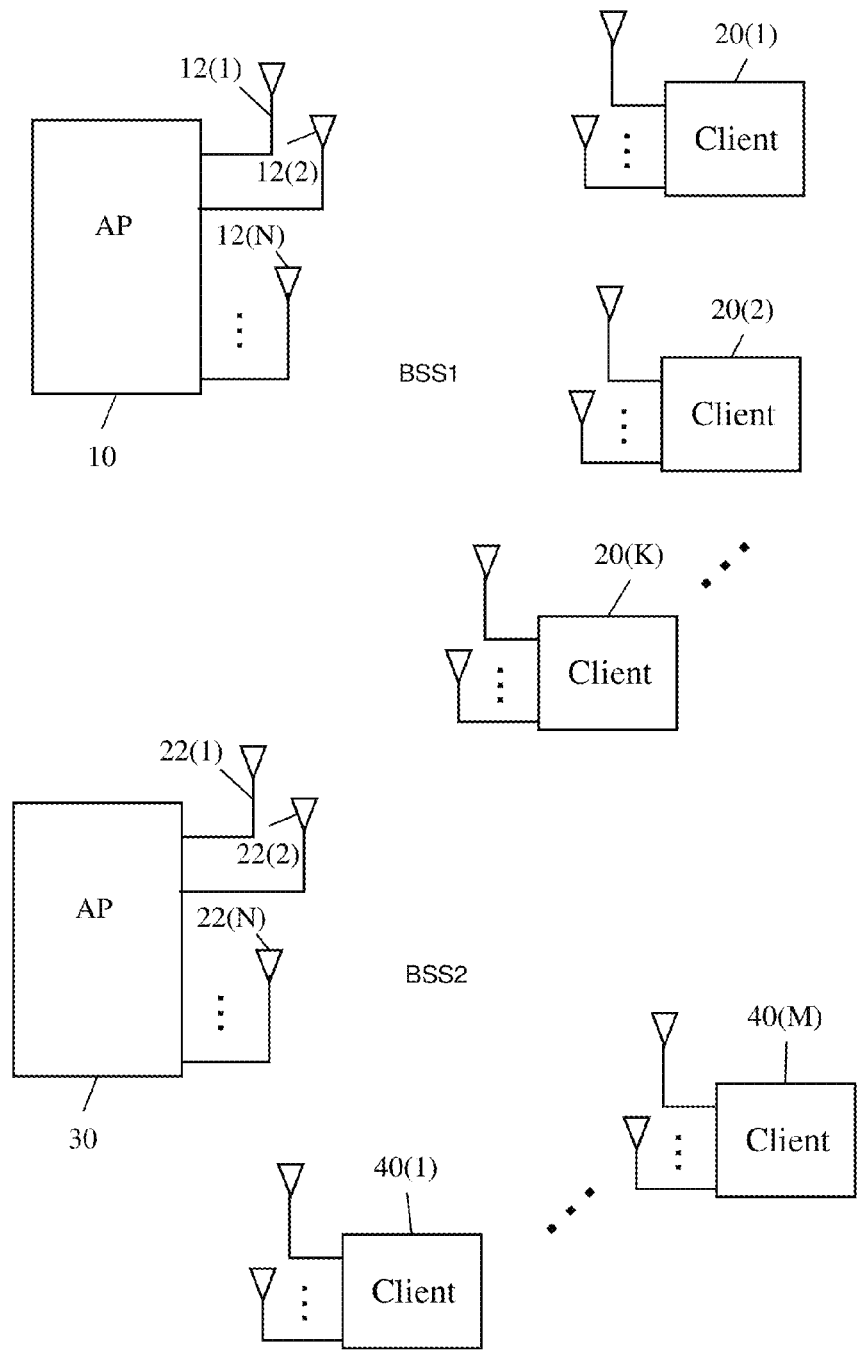
FIG. 1 is a diagram of a wireless network environment in which the uplink signal bandwidth characterization techniques described herein are useful.

Reference is first made to FIG. 1 that shows an example of a wireless network environment in which the techniques described herein are useful. In this example wireless network environment, there is an wireless access point (AP) device 10 that serves a plurality of wireless devices called "clients" 20(1)-20(K) in a first basic service set (BSS), denoted BSS1. The AP 10 comprises a plurality of antennas 12(1)-12(N). Each client device 20(1)-20(K) comprises one or more antennas. There is another AP 30 that serves a plurality of clients 40(1)-40(M) in a second BSS, denoted BSS2. The AP 30 comprises a plurality of antennas 22(1)-22(N). Each of the clients 40(1)-40(M) comprises one or more antennas.

As one example, the APs 10 and 30 and the wireless client devices 20(1)-20(K) and 40(1)-40(M) operate in accordance with the IEEE 802.11n and/or IEEE 802.11ac standards in which multiple frequency channels can be aggregated for wider bandwidth transmissions. That is, an AP may send to a particular client a downlink transmission that occupies at least two adjacent frequency channels that otherwise are used for individual (single channel) transmissions. The wider bandwidth transmission can carry more data and thus is useful when there is a substantial amount of data to be sent to the particular client, e.g., for video applications. When that particular client receives the wider bandwidth transmissions (packets), it sends an acknowledgment (ACK) frame in each of the frequency channels in which the downlink transmission was sent. This is known as a "legacy" duplicate mode transmission and is used by clients for sending ACK frames to the AP. Again, in a duplicate mode transmission, the same data, e.g., an ACK frame, is sent in each of the frequency channels that were used for the downlink transmission. For example, the AP 10 operating in BSS1, may receive a duplicate mode transmission from a particular client, e.g., client 20(2), in response to sending a wider bandwidth downlink transmission to client 20(2). The AP 10 can generate channel state information (CSI) for client 20(2) for the uplink signal bandwidth that encompasses the two or more channels based on the received ACK frame in the two or more channels. This is useful for the AP 10 to update beamforming weights used when beamforming the next downlink transmission to client 20(2).

Figure 2:
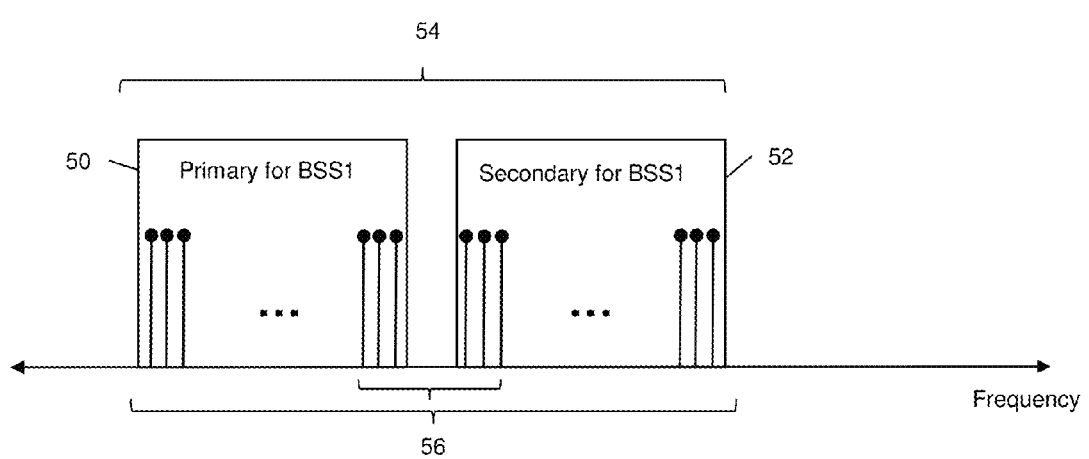
FIG. 2 is a diagram illustrating two adjacent frequency channels whose bandwidth is to be characterized according to the techniques described herein.

Reference is now made to FIG. 2. FIG. 2 shows a diagram of two adjacent channels 50 and 52 in a frequency band that are used for BSS1, where channel 50 is designated a "primary" channel and channel 52 is designated a "secondary" channel for purposes of wider bandwidth transmissions. The primary channel is the default channel used for normal mode/signal channel transmissions and the secondary channel is used, as needed, together with the primary channel for wider bandwidth downlink transmissions that occupy the primary and secondary channel. Transmissions made in each channel, e.g., transmissions using orthogonal frequency division multiplexed (OFDM) techniques, comprise power on multiple subcarriers that span the respective channels. In one example, channels 50 and 52 are each 20 MHz wide. It is possible that in one of the channels 50 and 52 that are used for BSS1, incident power at the AP 10 may be present from an overlapping adjacent BSS, as depicted in FIG. 1 for example. Thus, while channels 50 and 52 are used for BSS1, it is possible that in channel 52 there may be incident power from another BSS, e.g., BSS2.

Reference numeral 54 is intended to indicate that channels 50 and 52 may be aggregated for (wideband) downlink transmissions from an AP to a client, and that both channels are used for an ACK packet on uplink from that client to the AP. An ACK packet that is sent on an uplink to the AP is known in IEEE 802.11 as a duplicate mode packet because the same data is transmitted simultaneously in both the primary and secondary channels by the client to the AP.

Thus, for an AP that operates on channels 50 and 52, e.g., AP 10 shown in FIG. 1, power received in either of these channels could be power for a duplicate mode transmission from a client in BSS1 (sent in response or to acknowledge a downlink wider bandwidth transmission) or incidental power from a device (AP or client) in another (adjacent) BSS. It is desirable for the AP 10 to be able to determine whether the power in a given channel is for a duplicate mode transmission (duplicate of power sent in the other channel of a BSS) for a variety of reasons, such as computing beamforming weights for a client, location computations, etc.

In many wireless frequency channels, there is some coherence bandwidth that is greater than the subcarrier spacing (e.g., 312.5 KHz). It is common for this coherence bandwidth to span multiple subcarriers. Coherence bandwidth means that the channel state information (CSI) for the span of subcarriers within that bandwidth is highly correlated. By contrast, CSI from an overlapping BSS would have virtually no coherence bandwidth because the capture of the channel estimate is totally incoherent. The samples may be captured mid-symbol and also not during the part of the preamble used for channel estimation. Therefore, by evaluating correlation between subcarriers for the secondary channel and comparing it to correlation measured in the primary channel, it can be determined whether the signal received in the secondary channel is the other half of a duplicate mode packet or some incident power from an adjacent BSS.

In the case of the legacy duplicate mode over 40 MHz, the same data is transmitted over two adjacent 20 MHz channels. The 40 MHz channel is divided into 128 sub-carriers and the data are transmitted on carriers −58 to −6 and 6 to 58. Therefore, there should be a high correlation between adjacent subcarriers −2 and +2 if it is duplicate mode. More generally, in the IEEE 802.11a duplicate mode, subcarriers −32+26 and +32−26 (i.e., −6 and +6) are used and consequently the highest correlation is from the closest excited subcarriers. Otherwise, when the adjacent subcarriers of interest are occupied by received signals from different sources, the correlation on the subcarriers is random. Furthermore, IEEE 802.11n defines a 90 degree rotation between adjacent 20 MHz channels, and IEEE 802.11ac allows a 0 or 180 degree rotation. Consequently, "high correlation" is understood as high correlation after a "signed modulo" operation, i.e. an operation that maps the complex correlation to a +−45 deg region in the complex plane.

According to the techniques described herein, and as shown at reference numeral 56 in FIG. 2, one or more metrics are computed from received incident power in a frequency band to characterize the uplink signal bandwidth in order to determine whether the incident power (across the plurality of antennas of the AP) is indicative of a duplicate mode transmission, or packets or interference from a transmission in an overlapping BSS. The subcarriers that straddle the channel boundaries (as well as other subcarriers in the channels) are examined to determine their CSI correlation. There is a higher correlation of CSI when the transmission is from the same client, and lower correlation if the incident transmission is from another client or from interference. Thus, the one or more metrics indicate the likelihood that the signal (incident power) in the adjacent channels is from the same device. It is useful to know if incident power in the full bandwidth (of two or more adjacent channels) is coming from what is called an "inferred" client that is expected (i.e., a duplicate mode ACK) or is or includes interference from an adjacent BSS. This allows the AP to determine whether the CSI information derived from the received signals is valid for, for example, beamforming weight computation purposes to an inferred client, location computations, etc. The one or more metrics are computed based on received signals to provide an indication of what is occurring in the channels. In other words, the one or more metrics indicate how much of the uplink signal bandwidth the AP receives is really valid (valid CSI information) for beamforming back in wideband mode to a client.

Figure 3:
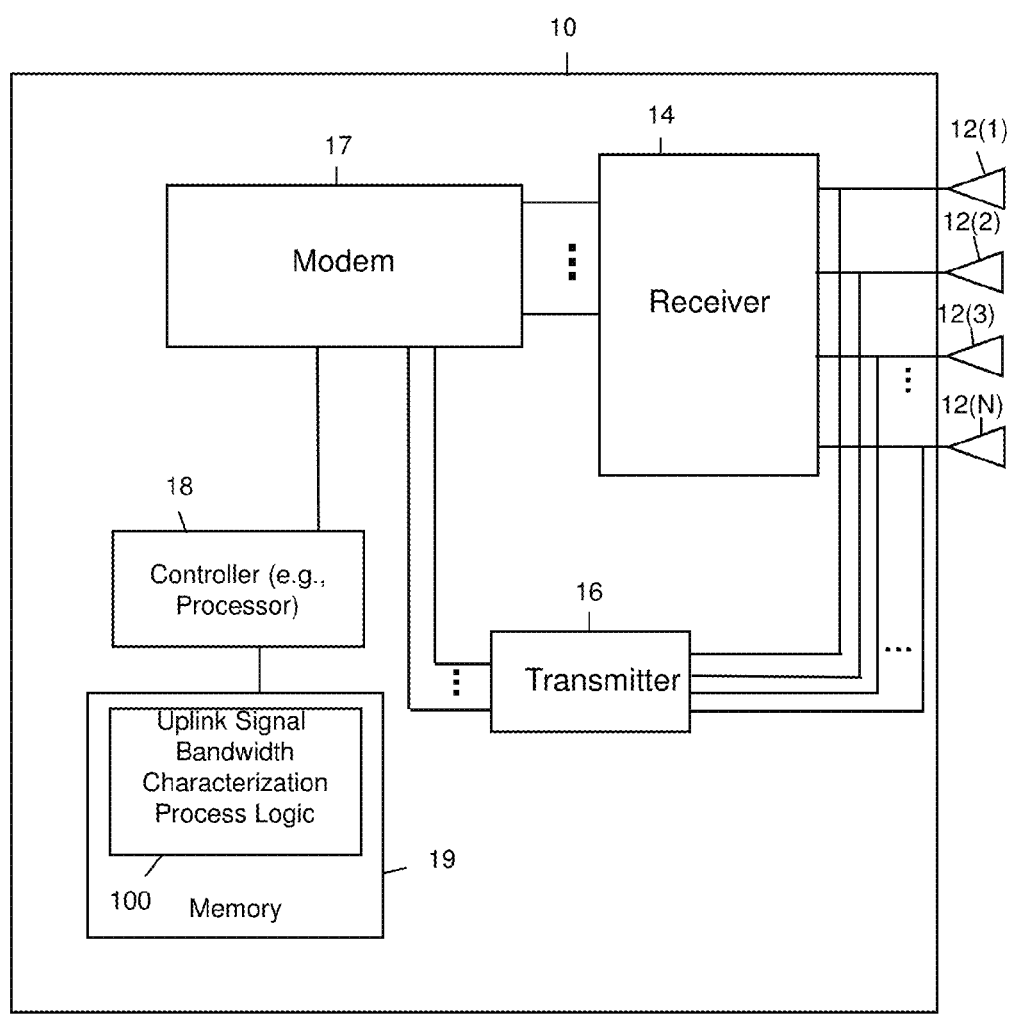
FIG. 3 is an example block diagram of a wireless communication device configured to perform the uplink signal bandwidth characterization techniques described herein.

FIG. 3 illustrates an example of a block diagram of the AP 10 that is configured to perform the uplink signal bandwidth characterization techniques described herein. As shown in FIG. 2, the AP 10 comprises a radio transmitter 14, a radio receiver 16, a modem 17, a controller 18 and a memory 19. The transmitter 14 upconverts antenna-specific baseband transmit signals (weighted from application of beamforming weights) to corresponding ones of the plurality of antennas 12(1)-12(N) for transmission. The transmitter 14 may comprise individual transmitter circuits that supply respective upconverted signals to corresponding ones of a plurality of antennas 12(1)-12(N) for transmission. For simplicity, these individual transmitter circuits are not shown in FIG. 3.

The radio receiver 16 downconverts signals detected by the plurality of antennas 12(1)-12(N) and supplies antenna-specific receive signals to the modem 17. The receiver 16 may comprise a plurality of individual receiver circuits, each for a corresponding one of a plurality of antennas 12(1)-12(N) and which outputs a receive signal associated with a signal detected by a respective one of the plurality of antennas 12(1)-12(N). For simplicity, these individual receiver circuits are not shown. The controller 18 supplies data to the modem 17 to be transmitted and processes data recovered by the modem 17 from received signals. In addition, the controller 18 performs other transmit and receive control functionality. It should be understood that there are analog-to-digital converters (ADCs) and digital-to-analog converters (DACs) in the various signal paths to convert between analog and digital signals.

The memory 19 stores data used for the techniques described herein. The memory 19 may be separate or part of the controller 18. In addition, instructions for uplink signal bandwidth characterization process logic 100 may be stored in the memory 19 for execution by the controller 18. The controller 18 supplies the beamforming weights to the modem 17 and the modem 17 applies the beamforming weights signal streams to be transmitted to produce a plurality of weighted antenna-specific transmit signals that are upconverted by the transmitter 14 for transmission by corresponding ones of the plurality of antennas 12(1)-12(N).

The memory 19 is a memory device that may comprise read only memory (ROM), random access memory (RAM), magnetic disk storage media devices, optical storage media devices, flash memory devices, electrical, optical, or other physical/tangible (non-transitory) memory storage devices. The controller 18 is, for example, a microprocessor or microcontroller that executes instructions for the process logic 50 stored in memory 19. Thus, in general, the memory 19 may comprise one or more computer readable storage media (e.g., a memory device) encoded with software comprising computer executable instructions and when the software is executed (by the controller 18) it is operable to perform the operations described herein in connection with process logic 100.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein (and/or to store software or processor instructions that are executed to carry out the computations described herein). Thus, the process logic 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. Some or all of the controller functions described herein, such as those in connection with the process logic 100, may be implemented in the modem 17.

Figure 4:
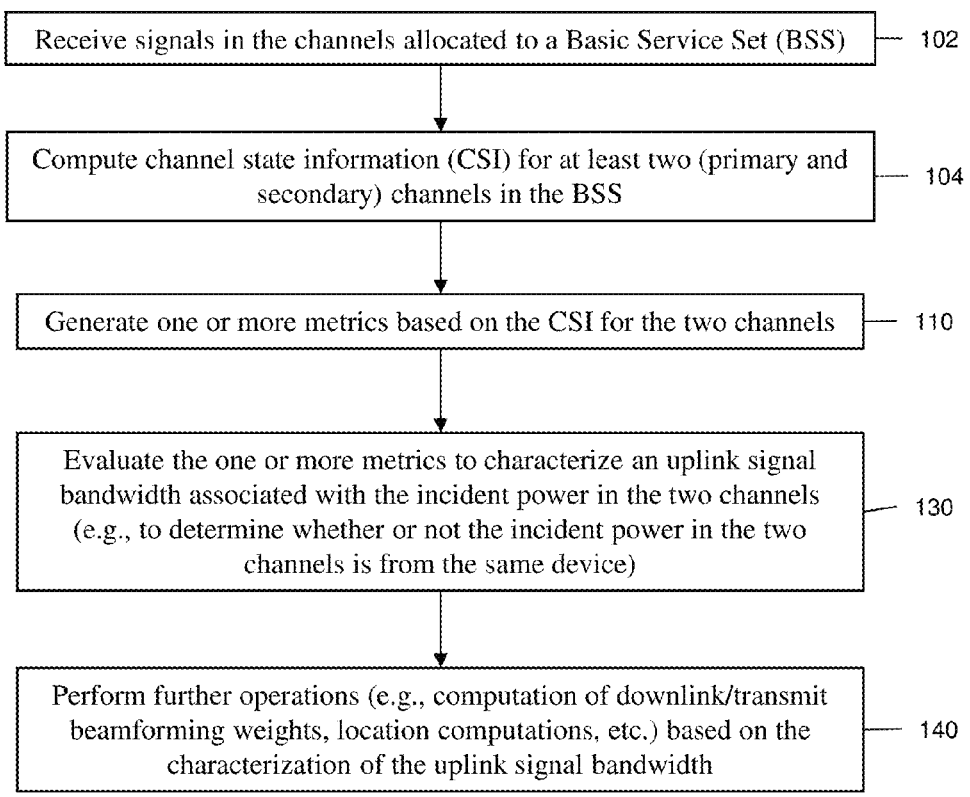
FIG. 4 is a general flow chart depicting operations of the uplink signal bandwidth characterization techniques.

Reference is now made to FIG. 4 for a high level description of the operation of the uplink signal bandwidth characterization process logic 100. At 102, the AP receives signals (incident power) in frequency channels allocated to a BSS in a wireless network, e.g., a wireless local area network. At 104, the AP computes channel state information (CSI) for subcarriers at a boundary of at least two channels in the BSS. Since the AP receives the incident power across a plurality of its antennas, it can generate CSI, which takes the form of a vector whose dimension is equal to the number of AP antennas. Thus, a CSI vector can be computed at each subcarrier in the channels. The CSI (or channel H vector) is computed by the AP's receiver during the normal course of receiving the uplink packet from a client. Using a known preamble, X, (in IEEE 802.11n it is several training fields called High-Throughput Long Training Fields) transmitted from the client to the AP, the known preamble can be removed from the received preamble, Y, to calculate the CSI, by computing $Y=H*X$. Because X is unitary and real, $Y=HXX'=H$, where ' signifies the transpose operation. This operation is performed at each subcarrier in each frequency channel to generate a channel H (or CSI) vector at each subcarrier.

At 110, one or more metrics are generated based on the CSI for the two frequency channels. Examples of metrics are described hereinafter in connection with FIGS. 5-7. At 130, the one or more metrics are evaluated to characterize an uplink signal bandwidth associated with the at least two channels to determine whether or not the incident power in the two channels is from the same device, e.g., a duplicate mode packet. At 140, further operations are performed based on the characterization of the uplink signal bandwidth. For example, when the evaluating operation 130 determines that the incident power in the two channels is from the same device, the further operations may involve computing downlink beamforming weights based on the CSI for the two channels to use for downlink transmissions to the device. Conversely, when the evaluating operation 130 determines that the incident power in the two channels is not from the same device, the channel state information for one of the two channels (e.g., the secondary channels) is discarded.

Figure 5:
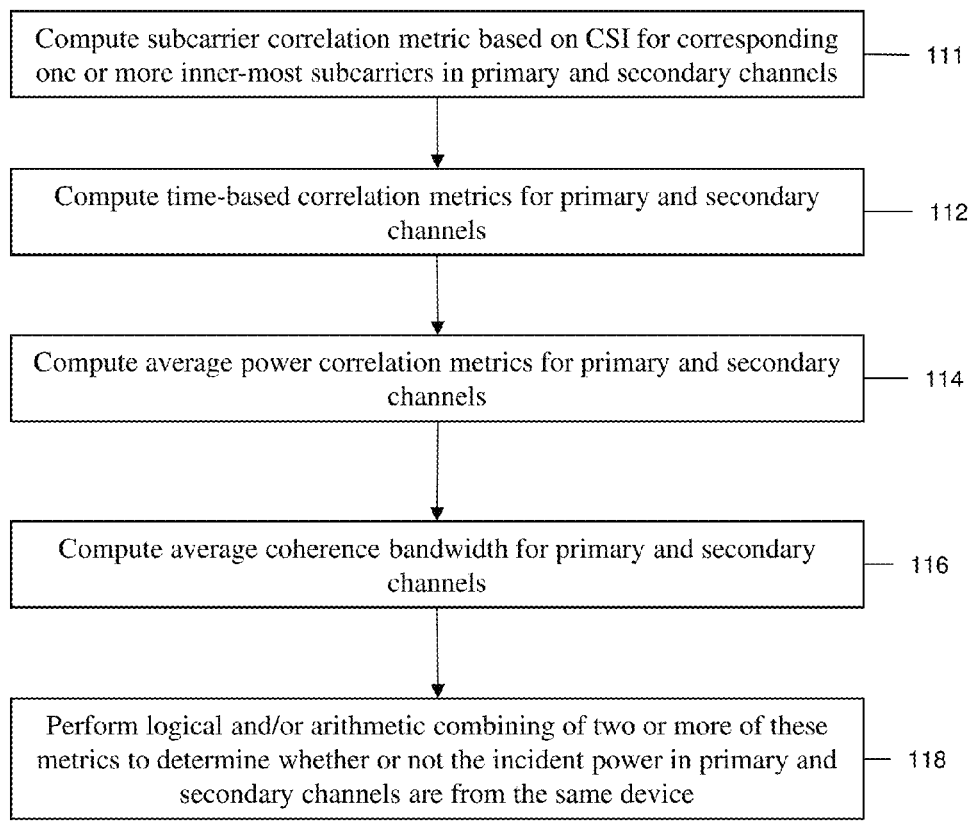
FIG. 5 is a flow chart depicting in more detail operations of the uplink signal bandwidth characterization techniques.

Reference is now made to FIG. 5 for a further description of operations 110 to generate the one or more metrics, according to one example. At 111, a metric is computed based on the CSI at corresponding one or more inner-most subcarriers in the primary and secondary channels, that is, subcarriers at the boundary of the primary and secondary channels. The term corrNegSC$_i$PosSC$_i$ refers to the correlation between the CSI at positive subcarrier i and negative subcarrier i, where i=6 in the example of 802.11a duplicate mode. Thus, in one example, the correlation of the CSI between one pair of corresponding subcarriers (e.g., i=6) is computed. More generally, this metric may be computed based on two or more pairs of subcarrier metrics, e.g., two pairs of subcarriers (2+2), four pairs of subcarriers (4+4) or sixteen pairs of subcarriers (16+16). Thus, the CSI subcarrier correlation metric is computed at 111 involves computing a correlation between the CSI at one or more positive subcarriers in the uplink signal bandwidth with CSI at corresponding one or more negative subcarriers.

At 112, time-based correlation metrics are computed for CSI in the primary and secondary channel. There may be a high correlation in time, for many channels for CSI from packets received from the same device. The term corrTprim is introduced to refer to correlation between CSI from time separated uplink packets on the primary channel, and the term corrTsec is introduced to refer to correlation between CSI from the same time separated uplink packets on secondary channel. If the secondary channel correlation of CSI from one received uplink packet to another received uplink packet is low relative to that of the primary channel, the incident power is most likely from an overlapping BSS. Thus, the time-based correlation metrics may involve computing a correlation between CSI for time separated uplink packets in one channel and a correlation between CSI for time separated uplink packets in the other channel.

At 114, an average power correlation metric is computed for the primary and secondary channels. The term PwrPrim denotes average power of the primary channel CSI and the term PwrSec denotes the average power of secondary channel CSI. If the incident power in the primary and secondary channels is from two different sources, it is less likely that PwrPrim will be similar to PwrSec. There are exceptions for channels that exhibit sharp gain slope only across the channel (e.g., 2-5 nsec of delay spread). Nevertheless, evaluation of the average power difference of the closest excited subcarriers, e.g., the four highest subcarriers from the primary channel and the four lowest subcarriers from the secondary channel may also be useful. In general, the average power at corresponding one, two, four or sixteen pairs of subcarriers may be useful to account for a range of delay spreads and signal-to-noise ratios.

At 116, the average coherence bandwidth for the primary and secondary channels is computed. Again, the coherence bandwidth refers to the span of subcarriers (contiguous subcarriers) that are highly correlated, in this case within the primary and secondary channels, respectively. The term cohBWprim refers to the average coherence bandwidth of the primary channel and cohBWsec refers to the average coherence bandwidth of the secondary channel.

At 118, a logical and/or arithmetic combining of two or more of the metrics is made to determine whether or not the received energy (incident power) in the primary and secondary channels are from the same device. An example of logical combining is as follows.

If: 1. corrNegSC$_i$posSC$_i$>thresholdCorr; AND
2. abs(10 log$_{10}$(PwrPrim)−10 log$_{10}$(PwrSec))<ThreshPwrDiff; AND
3. abs(corrTsec/corrTprim−1)<threshTcorr); AND
4. abs(1−cohBWprim/cohBWsec)<threshCohBW Then: the incident power in the primary and secondary channels is a duplicate mode packet (e.g., a 40 MHz duplicate mode packet) and the full bandwidth (e.g., 40 MHz) of CSI data for the primary and secondary channels is processed. This is referred to as a positive outcome.

Else: The incident power in the secondary channel is not from the same device as that of the primary channel—discard the CSI data for the secondary channel. This is referred to as a negative outcome.

In the above logical combining, thresholdCorr refers to a CSI correlation threshold, ThreshPwrDiff refers to a power difference threshold, threshTCorr refers to a time threshold, and threshCohBW refers to a coherence bandwidth threshold. The threshold for a particular metric may be dependent on the estimation of the coherence bandwidth. If the coherence bandwidth is relatively wide, a higher threshold maybe used, e.g., 0.9. If the coherence bandwidth is relatively narrow, the metric may not be used at all for purposes of evaluating the uplink bandwidth. For the power difference between channels, a spread or difference may be obtained while receiving identifiably full bandwidth signals from the client (from 40 MHz uplinks that identify the bandwidth) to create a threshold that does not deviate by more than some number of dB from that difference, e.g., no more than 10 dB from the typical difference.

In the above logical combining, the AND operation may be replaced with an OR operation in one or more of the instances. That is, if any one of the metrics, or certain combinations of the metrics in 1-4 above are found to be true, the positive outcome is declared.

It may also be desirable to employ arithmetic combining, or a combination of arithmetic combining and logical combining, of the metrics. An example of arithmetic combining is:

If [corrNeg2pos2/thresholdCorr+−abs (10 log 10(PwrPrim)−10 log$_{10}$(PwrSec))/ThreshPwrDiff+−abs (corrTsec/corrTprim−1)/threshTcorr+−abs(1−cohBWprim/cohBWsec)/threshCohBW]>thresh, then the incident power in the primary and secondary channels is from a duplicate mode packet.

Again, the combining may be a mixture of arithmetic and logical combining, where the logical combining can be AND, OR or even something more complex, such as "metric1>X AND metric2>Y OR metric3>Z" etc., or "metric1/X+metric2/Y>1 OR metric3>Z AND metric4>W" etc. In summary, the operation 118 may involve performing logical and/or arithmetic combining of two or more of the plurality of metrics to determine whether or not incident power in the two channels is from the same device.

Figure 6:
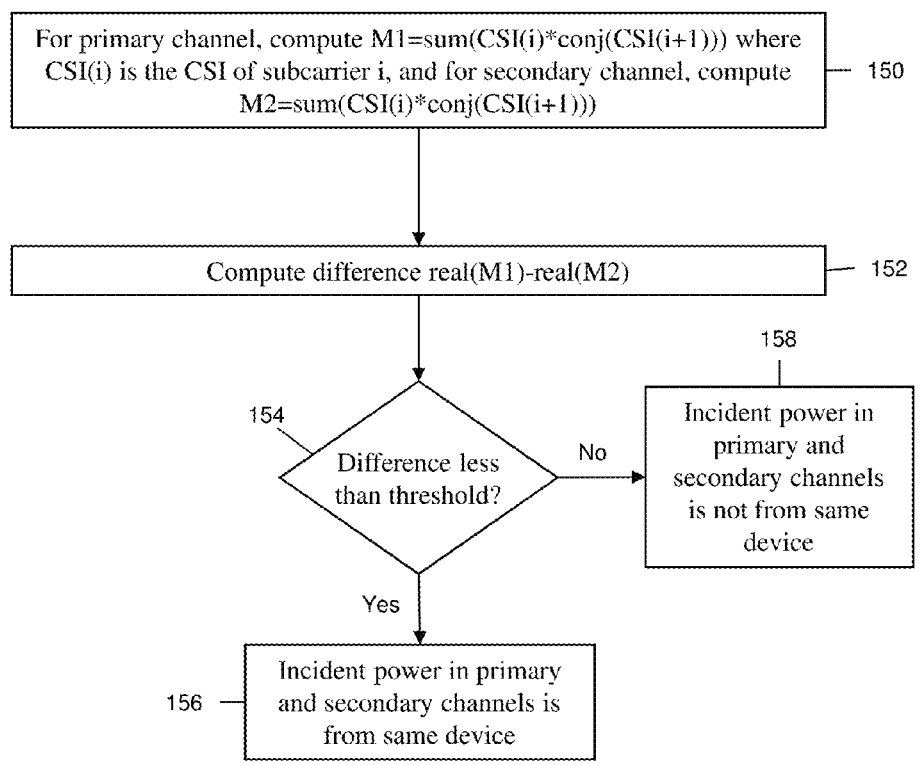
FIGS. 6 and 7 are flow charts depicting examples of additional metrics computed to characterize the uplink signal bandwidth.

In a high delay-spread environment where the coherent bandwidth is relatively narrow, some additional techniques may be useful. Reference is now made to FIG. 6 for a description of the computation of additional metrics to ascertain whether or not the entire uplink signal bandwidth contains incident power from a single device, i.e., a duplicate mode packet. These metrics involve processing each protocol data unit separately and can come to a conclusion without the need for comparison between time-separated protocol data units. These metrics can be used instead of or in addition to the other metrics described in connection with FIG. 5. Moreover, these metrics are useful when the analysis is performed for incident power received during a High Throughput-Long Training Field (HT-LTF) of an IEEE 802.11n preamble, for example.

At 150, for the primary channel, a quantity or metric M1 is computed as M1=sum(CSI(i)*conj(CSI(i+1))) where CSI(i) is the CSI of subcarrier i. In addition, for the secondary channel, a second quantity or metric M2 is computed as M2=sum(CSI(i)*conj(CSI(i+1))). The CSI(i)'s are vectors, conj( ) refers to the conjugate operation and sum( ) is a summation over the same subsets of subcarriers in the primary and secondary channels. At 152, the difference real (M1)-real(M2) is computed and at 154 this difference is compared with a threshold referred to as T1. If the difference is less than the threshold, then the incident power in primary and secondary channels is from the same device, e.g., a duplicate mode packet, as indicated at 156. Otherwise, at 158, it is declared that the incident power in the primary and secondary channels are not from the same device.

In another variation, the first quantity or metric for the primary channel computed at 150 is M1=sum(CSI(i)+CSI(i+1))*conj(CSI(i+1))/((|CSI(i)I+|CSI(i+2)I)*|CSI(i+1)|) and the second quantity or metric M2 is similarly computed for the secondary channel. The real(M1) is subtracted from the real(M2) to produce a difference that is compared with a threshold in a similar manner as depicted at 152 and 154 in FIG. 6.

Figure 7:
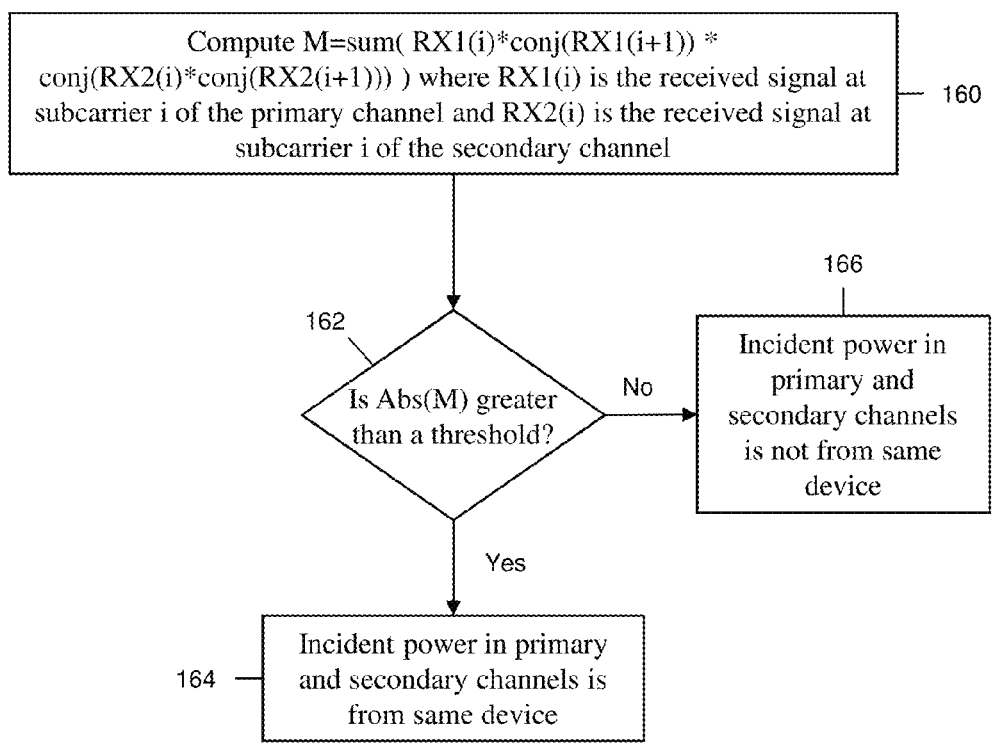

With reference to FIG. 7, another process is shown that is useful when the analysis is made during a data portion of protocol data unit, e.g., over one or multiple OFDM symbols. At 160, a metric M is computed as M=sum(RX1(i)*conj (RX1(i+1))*conj(RX2(i)*conj(RX2(i+1)))), where RX1(i) is the received signal at subcarrier i of the primary channel and RX2(i) is the received signal at subcarrier i of the secondary channel and sum( ) is a summation over a subset of subcarriers in the primary and secondary channels. At 162, the absolute value of M is compared with a threshold, e.g., T3. If it is determined at 162 that Abs(M) is greater than the threshold, then at 164 it is declared that the incident power in the primary and secondary channels is from the same device, a duplicate mode packet. Otherwise, at 166, it is declared that the incident power in the first and second channels are not from the same device (i.e., the incident power in the secondary channel is from an overlapping BSS).

Still another variation to the process of FIG. 7 is to compute two CSI vectors, a first CSI vector for a positive subcarrier (CSI$_1$) and a second CSI vector for a corresponding negative subcarrier (CSI$_2$), respectively, and compute a quantity M=abs(sum(CSI$_1$(i)*conj(CSI$_2$(i)/(|CSI$_1$(i)*CSI$_2$(i)|))), and where sum is over a subset of subcarriers, e.g., i=1 to 4. The positive subcarrier may be +6 and the negative subcarrier −6. This quantity is compared to a threshold and if the threshold is exceeded, it is declared that the incident power in the primary and secondary channels is from the same device. Thus, the quantity M in this example is derived from subcarrier-by-subcarrier correlation summed over all relevant subcarriers.

In the processes depicted in FIGS. 6 and 7, the summations, i.e., sum( ) are over a subset of subcarriers that result in a good complexity/error-rate tradeoff. The summation could be over subcarriers that are spread over an entire channel, e.g., 20 MHz, but the same subsets of subcarriers are considered both for the primary and secondary channels.

The metrics described in connection with FIGS. 6 and 7 can be used in combination with any of the others metrics described herein. This may be particularly useful when two different narrowband clients send their preambles at the same time.

The rationale for the techniques depicted in FIGS. 6 and 7 is as follows. Since the receiver is actively attempting to do acquisition on the primary (e.g., 20 MHz channel), the CSI in that channel will only exhibit a linear phase rotation (across subcarriers). This will be true of the CSI in the secondary channel if it is aligned in time with the primary channel (sent by the client and received by the AP at the same time). Otherwise, the CSI of the secondary channel can appear totally "phase-jumbled" if it is received and sampled during any portion of the packet that is not the LTF (since the channel estimation block is expecting totally different data than what is being sent). If the secondary channel happens to be sampled during the LTF of some "bogus" incident packet in the secondary channel, it will still exhibit some phase roll across subcarriers that will be high relative to the primary channel simply due to taking the Fast Fourier Transform (FFT) with some random sample delay relative to the primary channel. Therefore, a lot of the power of $x(i)'x(i+1)$ will shift into the imaginary component due to that rotation, where ' denotes the transpose operation.

Furthermore, in the case of a duplicate transmission, each term inside M1 and M2 is mostly a real number (with a small imaginary component, due to AWGN noise and due to slight channel selectivity over two subcarriers). Taking a summation over a set of subcarriers (tones), gives an average of the primary channel for M1 and an average of the secondary channel for M2, and since they are expected to be from the same client they tend to have about the same value. If there is no duplicated transmission, or if the primary channel is from one client and the secondary channel from another, then M1 and M2 are vastly different.

FIG. 7 exploits the principle of FIG. 6 in a different way. For example, assume that RX1(i) is the same as $CSI_1(i)$, etc. If there is duplicated transmission, M is a summation of a product of two almost real variables. This is due to RX1(i)*conj(RX1(i+1)) becoming an almost real quantity, representing the power of the primary channel at subcarrier i or i+1, and RX2(i)*conj(RX2(i+1)) is another almost real quantity, representing the power of the secondary channel at subcarrier i or i+1. M tends to become a large real number. If there is no duplicated transmission, then M is a summation of complex numbers which is much smaller (due to destructive summation of complex variables) than for the case of a duplicated transmission.

The procedure depicted by FIG. 7 works even if RX1(i) is not $CSI_1(i)$; i.e. it serves as a test for duplicated transmission over any part of the protocol data unit (not only a Short Training Field-STF). For example, assume RX1(i)=X(i)h1, RX1(i+1)=X(i+1)h1, RX2(i)=Y(i)h2, RX2(i+1)=Y(i+1)h2, where (a) AWGN noise is ignored for simplicity, (b) the channel is assumed to be relatively the same over two consecutive subcarriers, (c) X and Y values are the modulated values on each subcarrier (they are known in the case of a STF/LTF). Furthermore, assume a duplicated transmission is present (in the primary and secondary channels). Then (RX1(i)*conj(RX1(i+1)))*conj(RX2(i)*conj(RX2(i+1))) tends to be a large almost real number since both modulated symbols and primary/secondary channels all appear as their magnitude, almost removing imaginary parts (because presence of AWGN noise does not let imaginary parts go away fully). If there is no duplicated transmission, then the modulated values appear as complex variables (not as magnitude), and the primary/secondary channels do not appear as power/magnitude, making M a summation of complex variables which has much smaller value compared to the duplicate transmission case.

In summary, the techniques described herein determine whether uplink incident power at a plurality of antennas of a wireless device in two or more frequency channels is associated with a transmission from the same device. This is useful to determine whether to use or discard channel state information derived from uplink packets in one of the channels.

The techniques described herein addresses problems not heretofore addressed in wireless communication systems that employ beamforming and other techniques that use reliable information about the incident power in an uplink signal bandwidth. The applications in IEEE 802.11n and 802.11ac are only examples, though it is noted that these techniques are particularly useful in IEEE 802.11ac systems because there will be more situations when wideband transmission scenarios occur (40 and 80 MHz transmissions across two or more aggregated channels) and reliable information about the uplink signal bandwidth will be needed when computing downlink beamforming weights for a particular client.

In summary, a method is provided to allow a wireless communication device to determine whether or not received incident power in at least two channels is from the same device, e.g., a duplicated transmission. The wireless communication device receives, at its plurality of antennas, incident power in frequency channels allocated to a basic service set in a wireless network. Channel state information is computed for at least two frequency channels allocated to the basic service set. One or more metrics are generated based on the channel state information in the two frequency channels. The one or more metrics are evaluated to characterize an uplink signal bandwidth associated with the two channels to determine whether or not the incident power in the two channels is from the same device.

Similarly, an apparatus is provided that comprises a plurality of antennas, a receiver coupled to the plurality of antennas and configured to produce antenna-specific receive signals, and a controller coupled to the receiver. The controller is configured to compute channel state information for at least two frequency channels allocated to a basic service set based on received incident power at the plurality of antennas in the two frequency channels; generate one or more metrics based on the channel state information for the two frequency channels; and evaluate the one or more metrics to characterize an uplink signal bandwidth associated with the two channels to determine whether or not the incident power in the two channels is from the same device.

Further still, in another form, one or more computer readable storage media is provided that is encoded with software comprising computer executable instructions and when the software is executed by a processor, it is operable to: compute channel state information for at least two frequency channels allocated to a basic service set based on received incident power at a plurality of antennas of a wireless communication device in the two frequency channels; generate one or more metrics based on the channel state information for the two frequency channels; and evaluate the one or more metrics to characterize an uplink signal bandwidth associated with the two channels to determine whether or not the incident power in the two channels is from the same device.

The above description is intended by way of example only.

What is claimed is:

1. A method comprising:
   at a wireless communication device having a plurality of antennas, receiving incident power in at least two adjacent frequency channels allocated to a basic service set in a wireless network;
   computing channel state information for the at least two frequency channels allocated to the basic service set based on the incident power received in each of the at least two frequency channels;
   generating a plurality of metrics based on the channel state information in the at least two frequency channels, wherein the plurality of metrics include at least one of a channel state information subcarrier correlation metric between corresponding positive and negative subcarriers at a boundary of the at least two channels, and a time-based correlation metrics for channel state information in the at least two channels, respectively; and
   performing logical and/or arithmetic combining of two or more of the plurality of metrics to characterize an uplink signal bandwidth associated with the at least two channels to determine whether or not the incident power received in the at least two channels is from the same device.

2. The method of claim 1, wherein when evaluating determines that the incident power in the at least two channels is from the same device, further comprising computing downlink beamforming weights based on the channel state information for the at least two channels to use for downlink transmissions to the device.

3. The method of claim 1, wherein when evaluating determines that the incident power in the at least two channels is not from the same device, further comprising discarding the channel state information for one of the at least two channels.

4. The method of claim 1, wherein generating further comprises generating at least one of power correlation metrics for the at least two channels, respectively, an average coherence bandwidth for the at least two channels, respectively.

5. The method of claim 1, wherein generating the channel state information subcarrier correlation metric comprises computing a correlation between the channel state information at one or more positive subcarriers in the uplink signal bandwidth with channel state information at corresponding one or more negative subcarriers.

6. The method of claim 1, wherein generating the time-based correlation metrics comprises generating a correlation between channel state information for time separated uplink packets in one channel of the at least two channels and a correlation between channel state information for time separated uplink packets in a second of the at least two channels.

7. The method of claim 4, wherein generating the power correlation metrics for the at least two channels comprises generating an average power of the channel state information at corresponding one or more pairs of subcarriers for each of the at least two channels.

8. The method of claim 4, wherein generating the average coherence bandwidth for the at least two channels comprises generating an average coherence bandwidth for each of the at least two channels based on a span of subcarriers that are highly correlated in the respective channels.

9. The method of claim 1, wherein generating the one or more metrics comprises generating for a first channel a first quantity equal to sum(CSI(i)*conj(CSI(i+1))) and for a second channel that is adjacent to the first channel a second quantity equal to sum(CSI(i)*conj(CSI(i+1))), where CSI(i) is the channel state information of subcarrier i, CSI(i) is a vector, conj( ) is a conjugate operation, and sum( ) is a summation over the same subsets of subcarriers in the first and second channels, and wherein evaluating comprises computing a difference between a real portion of the first quantity and a real portion of the second quantity, and comparing the difference with a threshold such that when the difference is less than the threshold, it is determined that the incident power in the first and second channels is from the same device.

10. The method of claim 1, wherein generating the one or more metrics comprises generating for a first channel a first quantity equal to sum(CSI(i)+CSI(i+2))*conj(CSI(i+1))/ ((|CSI(i)|+|CSI(i+2)|)*|CSI(i+1)|) and for a second channel that is adjacent to the first channel a second quantity equal to sum(CSI(i)+CSI(i+2))*conj(CSI(i+1))/((|CSI(i)|+ |CSI(i+2)|)*|CSI(i+1)|), where CSI(i) is the channel state information of subcarrier i, CSI(i) is a vector, conj( ) is a conjugate operation, and sum( ) is a summation over the same subsets of subcarriers in the first and second channels, wherein evaluating comprises computing a difference between a real portion of the first quantity and a real portion of the second quantity, and comparing the difference with a threshold such that when the difference is less than the threshold, it is determined that the incident power in the first and second channels is from the same device.

11. The method of claim 1, wherein generating the one or more metrics comprises computing a quantity equal to sum (RX1(i)*conj(RX1(i+1))*conj(RX2(i)*conj(RX2(i+1)))), where RX1(i) is the received signal at subcarrier i of a first channel and RX2(i) is the received signal at subcarrier i of a secondary channel that is adjacent to the first channel, and sum( ) is a summation over a subset of subcarriers in the first and second channels, computing an absolute value of the quantity, and wherein evaluating comprises comparing the absolute value of the quantity with a threshold such that when the absolute value of the quantity exceeds the threshold it is determined that the incident power in the first and second channels is from the same device.

12. The method of claim 1, wherein generating the one or more metrics comprises computing a first channel state information vector for a positive subcarrier (CSI1) and a second channel state information vector for a corresponding negative subcarrier (CSI2), and computing a quantity equal to abs(sum (CSI1(i)*conj(CSI2(i))/(|CSI1(i)*CSI2(i)|))), and where sum( ) is a summation over a subset of subcarriers in the first and second channels, comparing the quantity with a threshold such that when the absolute value of the quantity exceeds the threshold it is determined that the incident power in the first and second channels is from the same device.

13. An apparatus comprising:
   a plurality of antennas;
   a receiver coupled to the plurality of antennas and configured to produce antenna-specific receive signals;
   a controller coupled to the receiver, wherein the controller:
      computes channel state information for at least two frequency channels allocated to a basic service set based on received incident power at the plurality of antennas in the at least two frequency channels;
      generates a plurality of metrics based on the channel state information for the at least two frequency channels, wherein the plurality of metrics include at least one of a channel state information subcarrier correlation metric between corresponding positive and negative subcarriers at a boundary of the at least two channels, and a time-based correlation metrics for channel state information in the at least two channels, respectively; and performs logical and/or arithmetic combining of two or more of the plurality of metrics to characterize an uplink signal bandwidth associated with the at least two channels to determine whether or not the incident power received in the at least two channels is from the same device.

14. The apparatus of claim 13, wherein when the controller determines that incident power in the at least two channels is from the same device, the controller computes downlink beamforming weights based on channel state information for the at least two channels to use for downlink transmissions to the device, and when the controller determines that the incident power in the at least two channels is not from the same device, the controller discards the channel state information for one of the at least two channels.

15. The apparatus of claim 13, wherein the controller further generates at least one of power correlation metrics for the at least two channels, respectively, and an average coherence bandwidth for the at least two channels, respectively.

16. The apparatus of claim 13, wherein to generate the channel state information subcarrier correlation metric, the controller computes a correlation between the channel state information at one or more positive subcarriers in the uplink signal bandwidth with channel state information at corresponding one or more negative subcarriers.

17. The apparatus of claim 13, wherein to generate the time-based correlation metrics, the controller generates a correlation between channel state information for time separated uplink packets in one channel of the at least two channels and a correlation between channel state information for time separated uplink packets in a second of the at least two channels.

18. The apparatus of claim 15, wherein to generate the power correlation metrics for the at least two channels, the controller generates an average power of the channel state information at corresponding one or more pairs of subcarriers for each of the at least two channels.

19. The apparatus of claim 15, wherein to generate the average coherence bandwidth for the at least two channels, the controller generates an average coherence bandwidth for each of the at least two channels based on a span of subcarriers that are highly correlated in the respective channels.

20. One or more non-transitory computer readable storage media encoded with software comprising computer executable instructions and when the software is executed by a processor operable to:

compute channel state information for at least two frequency channels allocated to a basic service set based on received incident power at a plurality of antennas of a wireless communication device in the at least two frequency channels;

generate a plurality of metrics based on the channel state information for the at least two frequency channels, wherein the plurality of metrics include at least one of a channel state information subcarrier correlation metric between corresponding positive and negative subcarriers at a boundary of the at least two channels, and a time-based correlation metrics for channel state information in the at least two channels, respectively; and perform logical and/or arithmetic combining of two or more of the plurality of metrics to characterize an uplink signal bandwidth associated with the at least two channels to determine whether or not the incident power in the at least two channels is from the same device.

21. The non-transitory computer readable storage media of claim 20, further comprising instructions operable to compute downlink beamforming weights based on channel state information for the at least two channels to use for downlink transmissions to the device when it is determined that incident power in the at least two channels is from the same device, and to discard the channel state information for one of the two channels when it is determined that the incident power in the at least two channels is not from the same device.

22. The non-transitory computer readable storage media of claim 20, wherein the instructions operable to generate the plurality of metrics further comprise instructions operable to generate at least one of power correlation metrics for the at least two channels, a respectively, and an average coherence bandwidth for the at least two channels, respectively.

23. The non-transitory computer readable storage media of claim 20, wherein the instructions operable to generate the channel state information subcarrier correlation metric comprise instructions operable to compute a correlation between the channel state information at one or more positive subcarriers in the uplink signal bandwidth with channel state information at corresponding one or more negative subcarriers.

24. The non-transitory computer readable storage media of claim 20, wherein the instructions operable to generate the time-based correlation metrics comprise instructions operable to generate a correlation between channel state information for time separated uplink packets in one channel of the at least two channels and a correlation between channel state information for time separated uplink packets in a second of the at least two channels.

25. The non-transitory computer readable storage media of claim 22, wherein the instructions operable to generate the power correlation metrics for the at least two channels comprise instructions operable to generate an average power of the channel state information at corresponding one or more pairs of subcarriers for each of the at least two channels.

* * * * *